United States Patent [19]

Loven

[11] 4,456,858

[45] Jun. 26, 1984

[54] PERMANENT MAGNETIC A.C.-D.C. MOTOR

[76] Inventor: James F. Loven, 815 Monroe Ave., Scranton, Pa. 18510

[21] Appl. No.: 311,517

[22] Filed: Oct. 15, 1981

[51] Int. Cl.³ .............................................. H02P 3/08
[52] U.S. Cl. .................................... 318/138; 318/696; 310/49 R; 310/156
[58] Field of Search ............ 310/156, 158, 181, 49 R; 318/138, 313, 342, 345 R, 345 C, 345 G, 696, 685

[56] References Cited

U.S. PATENT DOCUMENTS

| | | | |
|---|---|---|---|
| 3,112,464 | 11/1963 | Ratajski et al. | 310/156 |
| 3,325,710 | 6/1967 | Reynolds | 318/345 C X |
| 3,675,104 | 7/1972 | Allison et al. | 318/345 C X |
| 3,934,216 | 1/1976 | Ward | 310/156 X |
| 4,011,487 | 3/1977 | Loomis | 313/138 |
| 4,138,617 | 2/1979 | Sudler | 310/156 X |
| 4,197,489 | 4/1980 | Dunn et al. | 318/313 X |
| 4,257,092 | 3/1981 | Prines et al. | 318/345 G X |

Primary Examiner—G. Z. Rubinson
Assistant Examiner—Richard M. Moose
Attorney, Agent, or Firm—Brady, O'Boyle & Gates

[57] ABSTRACT

Disclosed is a rotary machine powered by magnetic fields and comprises at least one fixed and at least one movable permanent magnetic member which have a curvilinear surface adapted to provide mutually eccentric magnetic fields and which operate to rotate the movable member with respect to the fixed member until a magnetic equilibrium position is reached, at which time means are included to rotate the movable member away from the equilibrium position, whereupon the eccentric fields again interact to cause rotation. The curvilinear surfaces are in the form of a spiral which expand in an arithmetic or geometric progression and are poled to provide alternatively either attractive or repulsive forces between opposing faces of the magnetic members.

27 Claims, 15 Drawing Figures

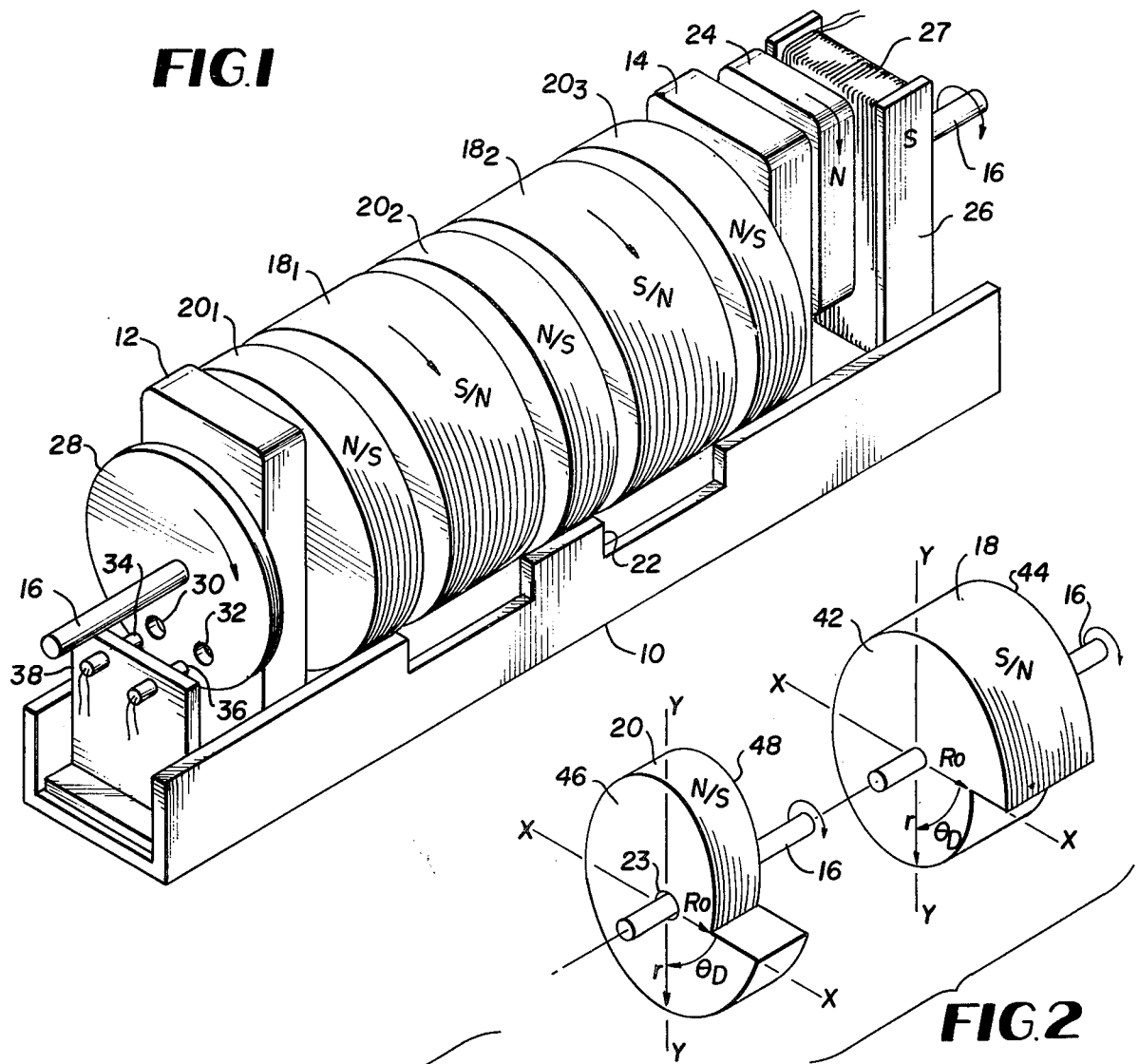
FIG.1
FIG.2
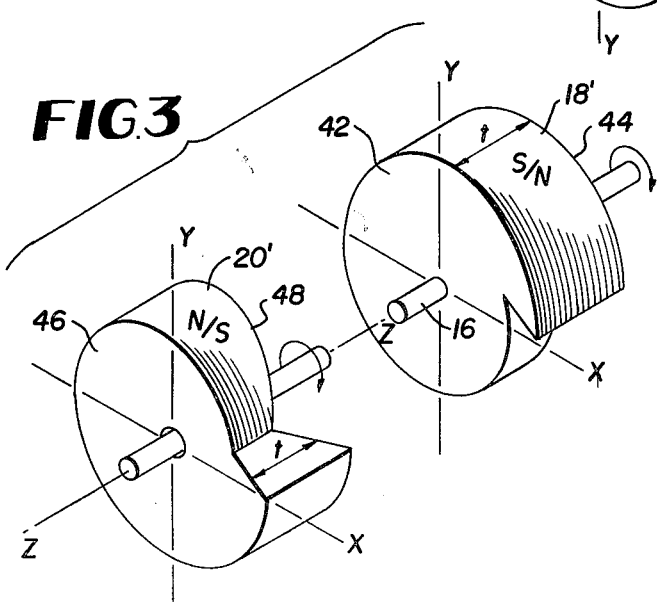
FIG.3

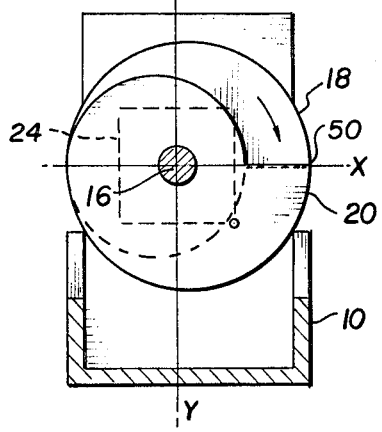 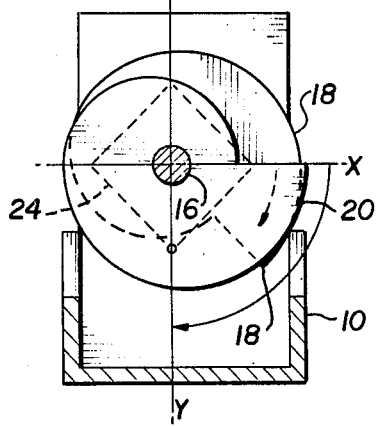 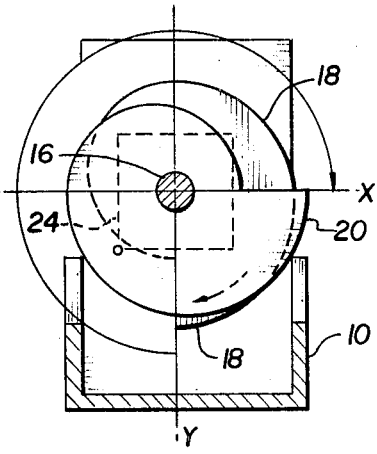
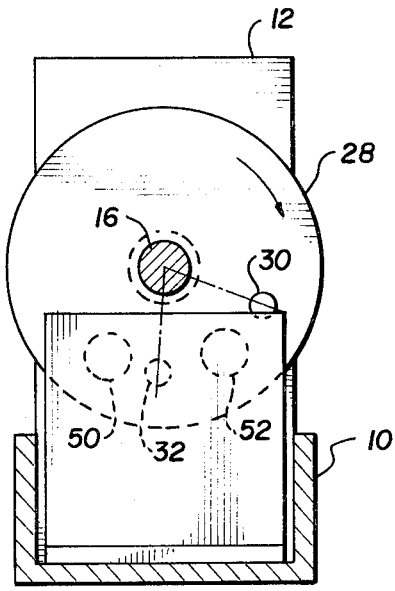
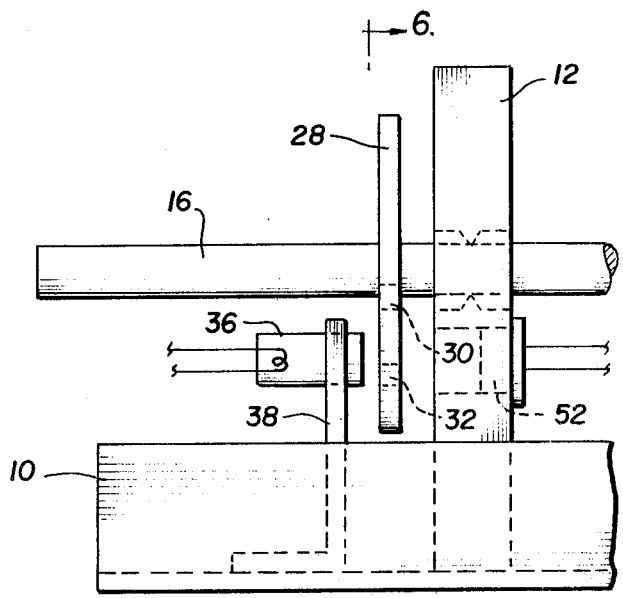
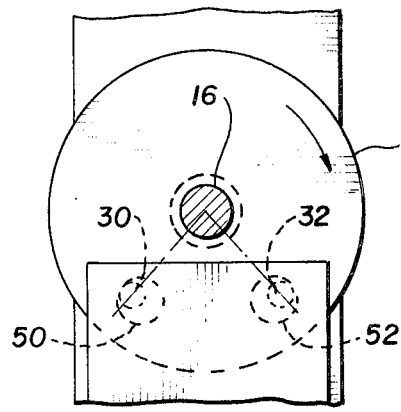

PERMANENT MAGNETIC A.C.-D.C. MOTOR

BACKGROUND OF THE INVENTION

This invention relates generally to permanent magnet machines and more particularly to permanent magnet machines of the rotary type.

Rotary machines powered by the mutual interaction of the permanent magnetic field members are generally known. Apparatus employing such interaction between a stator and a rotor has found application for example in brushless DC motors, pulse motors and electric stepping motors.

It is an object of the present invention, therefore, to provide an improved permanent magnet machine.

It is another object of the present invention to provide an improved permanent magnet machine which is relatively simple in construction yet extremely efficient in its operation.

A further object of the present invention is to provide a permanent magnet motor which is able to provide a relatively high torque as well as a relatively high rotational speed.

A still further object of the invention is to provide a permanent magnet rotary electrical generator which is adapted to provide a relatively high energy conversion efficiency.

SUMMARY

These and other objects are provided by at least two spatially related magnetic members, one of which is fixed and one of which is rotatable and wherein the magnetic members are comprised of permanent magnets and shaped to have a curvilinear surface configuration which is adapted to provide mutually eccentric magnetic fields which operate to move, i.e. rotate, one member with respect to the other until a magnetic equilibrium position is reached and additionally including means to move said one rotatable member away from the equilibrium position until the eccentric magnetic field in the relationship again takes over. The curvilinear surface configuration of the permanent magnetic members comprises a spiral-like surface which expands in an arithmetic or geometric progression. In an axial embodiment, mutually opposing faces are formed to have mutually reverse spirals and are poled to provide mutually repulsive forces therebetween. In a planar embodiment, the permanent magent members are in the form of two opposing spiral bands which are poled to provide mutually attractive forces between the spiral bands.

BRIEF DESCRIPTION OF THE DRAWINGS

FIG. 1 is a perspective view generally illustrative of the preferred embodiment of the subject invention;

FIG. 2 is an exploded perspective view of first type of permanent magnetic members utilized in the embodiment shown in FIG. 1;

FIG. 3 is an exploded perspective view of second type of permanent magnetic members utilized in the embodiment shown in FIG. 1;

FIGS. 4A-4C are diagrams helpful in understanding the operation of the embodiment shown in FIG. 1;

FIG. 5 is a partial side planar view of the forward portion of the embodiment shown in FIG. 1;

FIG. 6 is a sectional view of FIG. 5 taken along the lines 6—6 and has for its purpose illustrating the operation of the invention as embodied in FIG. 1;

FIG. 7 is a partial sectional view taken along the lines 6—6 and being further illustrative of the operation of the embodiment shown in FIG. 1;

DESCRIPTION OF THE PREFERRED EMBODIMENTS

Figure 8:
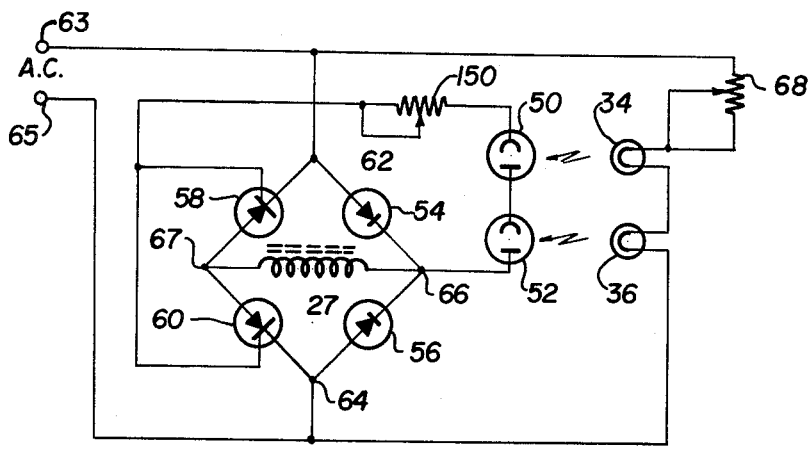
FIG. 8 is an electrical schematic diagram of AC powered circuitry for periodically pulsing the rotary magnets of the subject invention.

Referring now to the drawings wherein like reference numerals refer to like parts, reference numeral 10 of FIG. 1 denotes an elongated base member generally in the form of a U-shaped channel which supports a pair of generally rectangular pillow blocks 12 and 14 which are adapted to provide bearings for an elongated rotatable shaft 16 to which is secured a plurality of generally round rotatable permanent magnet elements $18_1$, $18_2$. The elements are located in the space between the pillow blocks 12 and 14 along with a plurality of similarly round fixed permanent magnet elements $20_1$, $20_2$, and $20_3$. The permanent magnet elements $20_1$, $20_2$, $20_3$ are secured to the base 10 by being attached, for example, to the base projections 22 and include central axial bores as shown by reference numeral 23 in FIG. 2 for the passage of the shaft 16 therethrough.

As shown in FIG. 1, the rotatable and fixed permanent magnet members are axially aligned and alternate in position between the pillow blocks 12 and 14. Moreover, the permanent magnet elements $18_1$, $20_1$, etc. are comprised of geometric shapes, two examples of which are shown in FIGS. 2 and 3 and are magnetized such that their mutually opposing faces are oppositely poled e.g. S/N vs. N/S to provide a mutually repelling magnetic field which will produce a rotation of the relatively thicker elements $18_1$, $18_2$, and thus produce a torque on the shaft 16. The production of torque results from mutually eccentric magnetic fields which result as a consequence of the configuration of the opposing faces of the members $18_1$ and $20_1$. Rotation proceeds until an equilibrium field position is reached at some portion of the revolution of the rotating elements $18_1$, $18_2$, whereupon an additional rotational force is then supplied to bring the permanent magnets back into an eccentric field condition once again.

The additional force is provided by means of an additional permanent magnet 24 which is also rotatably secured to the shaft 16 by being located on the far side of the pillow block 14 as shown in FIG. 1. Also on the far side of the pillow block 14 is an electromagnet assembly 26 including a coil 27 which, when energized, causes the permanent magnet 24 to rotate due to the relative polarities exhibited by their respective opposing surfaces. The polarities exhibited by members 24 and 27 in FIG. 1 are polarities oriented in the perpendicular planes to the opposing surfaces of the two members 24 and 27. The electromagnet 26 is adapted to be energized at the equilibrium position between the permanent magnet elements $18_1$, $20_1$, $18_2$, $20_2$, etc. by means of a circular flat plate 28 which is secured to the shaft 16 in front of the pillow block 12. The circular plate 28 includes a pair of circular apertures 30 and 32 which are adapted to pass light energy therethrough from a pair of miniature light sources 34 and 36 mounted in a vertical support plate 38 secured to the walls of the base member 10. As will be shown, when light passes through both apertures 30 and 32 simultaneously an electrical circuit will become operative to apply a DC energizing potential to the coil 27 of the electromagnet 26 and thus cause the shaft 16 to rotate as a result of the attractive force acting on the permanent magnet 24. Since the permanent magnet 24 is rigidly secured to the shaft 16 along with the permanent magnet elements $18_1$, $18_2$, $18_3$, an angular displacement is provided at an appropriate time to, in effect, pulse the rotor or armature assembly including the rotatable elements $18_1$, $18_2$ to turn the necessary amount during each revolution until the interacting forces between opposing faces of the permanent magnet elements $18_1$, $20_1$ ... take over. Thus what is provided is a permanent magnet motor which is primarily powered by the mutually repulsing forces exerted between the faces of the permanent magnet elements $18_1$, $20_1$, etc. while being pulsed by the interaction of the permanent magnet 24 and the electromagnet 26 during a small portion of each revolution.

The heart of the inventive concept embodied in the configuration shown in FIG. 1 lies in the structural details of the rotatable permanent magnets $18_1$, $18_2$, $18_3$ and the fixed permanent magnets $20_1$, $20_2$, etc. To this end reference will now be made to FIG. 2 which discloses a first and simplest type of configuration for one opposing set of permanent magnets 18 and 20 located between the pillow blocks 12 and 14 in FIG. 1. As shown in FIG. 2, the rotatable permanent magnet 18 is of a substantially constant thickness(t) as is the fixed permanent magnet 20, however, the thickness of the permanent magnet 18 is substantially greater than that of the permanent magnet 20. What is significant, however, is the geometrical pattern described by the faces 42 and 44 of the permanent magnet 18 and the faces 46 and 48 of the magnet 20. using an X-Y rectangular coordinate system it can be seen that the radius r of the face 42 of the rotatable permanent magnet 18 progressively enlarges from a base radius $R_o$ in a clockwise direction from the X axis while a radius r of the face 46 of the permanent magnet 20 enlarges in a counterclockwise direction from a base radius $R_o$ beginning from the right hand X axis. While the respective outside edges generally define mutually reversing spirals, the respective radii of the faces 42 and 46 follow an arithmetic or geometric progression for a unit span of progression, such as 90° of arc, which is described in the following relationships expressed in rectilinear X and Y coordinates.

With respect to arithmetic progression of face 46 for a counterclockwise progression of the radius r, it can be expressed by the relationship:

$$y=\sin \theta \ (R_o+n\theta/\theta_D) \tag{1}$$

$$x=\cos \theta \ (R_o+n\theta/\theta_D) \tag{2}$$

where n is the linear measurement of change in radius r over a unit span of progression, $R_o$ is the base or smallest radius as shown in FIG. 2, $\theta_D$ is the unit span of progression and comprises 360°/n where n is an integer, and $\theta$ is the angle described by the radius r with reference to the right hand X axis.

On the other hand for a clockwise progression of the radius r of the face 42, the following orthogonal relationship in two dimensions describes its progression:

$$y=\sin \theta \ [R_o+n \ (360°-\theta/\theta_D)] \tag{3}$$

$$x=\cos \theta \ [R_o+n \ (360°-\theta/\theta_D)] \tag{4}$$

or simple $$y=\sin \theta(R_o-n\theta/\theta_D) \tag{5}$$

$$x=\cos \theta(R_o-n\theta/\theta_D) \tag{6}$$

A variation of the structure of the permanent magnet elements 18 and 20 shown in FIG. 2 is shown in FIG. 3 wherein reference numerals 18' and 20' denote a rotatable and fixed permanent magnet having faces 42' and 46' which have the same radial arithmetic progressions as shown in FIG. 2; however, the elements 18' and 20' also include an arithmetic progression in their respective thickness dimensions t which for the clockwise progression of the radius r such as face 46 can be expressed as:

$$\pm Z=\pm n \ \theta/\theta_D \tag{7}$$

or $$t=2n\theta/\theta_D \tag{8}$$

while for the counterclockwise progression of the radius r such as the face 42, the thickness dimension can be expressed as:

$$\pm Z=\pm n(360°-\theta/\theta_D) \tag{9}$$

or $$t=2n(360°-\theta/\theta_D) \tag{10}$$

With respect to a geometrical radial progression of the face 46 counterclockwise, it progresses in m angular divisions of 360° according to the expressions:

$$y=\sin \theta \ [R_o+2^m \ n\theta/\theta_D \ (m+1)] \tag{11}$$

$$x=\cos \theta \ [R_o+2^m \ n\theta/\theta_D \ (m+1)] \tag{12}$$

where m is an integer from 0, 1, 2, 3, ... dependent on the number of divisions of 360° desired and increases successively in value. Accordingly m=0 for the first angular division, m=1 for the second angular division and so on.

For a clockwise geometrical progression of the radius of the face 42, the following relationship obtains:

$$y=\sin \theta \ [R_o+2^m \ n(\theta_D(m+1)/\theta)] \tag{13}$$

$$x=\cos \theta \ [R_o+2^m \ n(\theta_D(m+1)/\theta)] \tag{14}$$

The three dimensional expression involving the thickness t of element 20' of FIG. 3 having a counterclockwise geometrical progression of thickness can be stated as:

$$\pm Z = \pm 2^m \, n\theta/\theta_D (m=1) \qquad (15)$$

or $$t = 2[Z^m \, n\theta/\theta_D(m+1)] \qquad (16)$$

while for a clockwise geometrical progression of thickness such as element 18′, the following expression describes the progression in thickness:

$$\pm Z = \pm 2^m \, n\theta_D(m+1)/\theta \qquad (17)$$

or $$t = 2[2^m \, n\theta_D(m+1)/\theta] \qquad (18)$$

It should be noted that other variations of the permanent magnet elements may be resorted to from those shown in FIGS. 2 and 3, depending upon the specific application of the designer. For example, the configuration of FIG. 3 may be modified such that each of the elements can be sub-divided into sub-structures which have their respective thicknesses reduced in progressive order. Also, the unit span of progression $\theta_D$, which although is shown to be 90° in FIG. 2, can be smaller increments, for example, 30° or less. The latter feature has the effect of varying the point at which magnetic field equilibrium position occurs between the mutually opposing faces 42 and 48 of the permanent magnetic elements 18 and 20.

The operation of the embodiment in FIG. 1 can readily be understood by reference to FIGS. 4A, 4B and 4C, which schematically represent in a front plan view one rotatable permanent magnet 18 located in back of one fixed permanent magnet 20.

It can be seen from these figures that the respective radius progression of the faces of the two permanent magnets 18 and 20 are mutually opposite as was explained, for example, with respect to elements shown in FIG. 2. As shown in FIG. 4A, both elements 18 and 20 have their respective origin or discontinuity as denoted by the edge 50 lying along the right hand X axis. Such a mutual relationship between the opposing faces of the permanent magnets 18 and 20 results in a condition of magnetic force equilibrium between opposing faces of like polarity; however, if the rotatable permanent magnet 18 is rotated clockwise 90° as shown in FIG. 4C, the physical parameters are such that with a unit span of progression $\theta_D$ of 90°, eccentric permanent magnetic forces interact between the faces of the rotating element 18 and the fixed permanent magnet element 20 to cause a rotation of the magnet 18 by the force of repulsion for the remaining 270°. The 270° of rotation as effected by the magnetic force interaction between the faces of the rotatable element 18 and the fixed element 20, can be thought of as a torque producing mode for one revolution of the permanent magnet 18 while the portion of the revolution shown in FIG. 4B for the positive X axis to the negative Y axis (90°) is the portion of the revolution which requires pulsing by the mutual interaction between the permanent magnet 24 and the electromagnet 40 shown in FIG. 1. While the diagrams of FIGS. 4A-4C are illustrated in a more or less static sense, it should be observed that in actual operation rotational inertia will inherently shorten the pulse mode as shown in FIG. 4B. Again, as noted above the angular span of the pulse mode can be further reduced by designing the apparatus to have a smaller unit span of progression $\theta_D$.

FIGS. 5, 6 and 7 are intended to illustrate the means for initiating pulse mode. FIG. 5 in addition to illustrating the position of the lamp 36 which is one of the lamps 34 and 36 shown in FIG. 1, also discloses one photocell 52 of two photocells mounted in the pillow block 12. In FIGS. 6 and 7, a pair of photocells 50 and 52 are shown mounted in pillow block 12. These photocells are in registration with the lamps 32 and 34 but only receive light energy therefrom when the apertures 30 and 32 of the plate 28 rotate into position to allow the light energy to pass therethrough. In the preferred embodiment of the subject invention, the electromagnet 26 (FIG. 1) will only become energized when both photocells 50 and 52 are illuminated simultaneously, such as in the position shown in FIG. 7.

Figure 9:
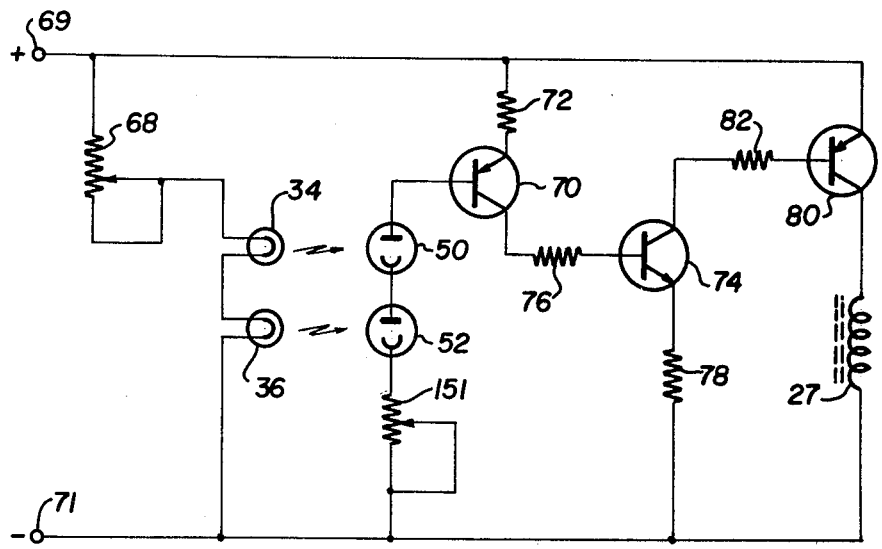
FIG. 9 is an electrical schematic diagram of DC powered circuitry for periodically pulsing the rotary magnets of the subject invention.

Two circuits for energizing the electromagnet 26 in response to light energy impinging upon the photocells 50 and 52 are shown in FIGS. 8 and 9. Referring first to the circuit diagram illustrated in FIG. 8, it constitutes an AC powered circuit including a full-wave bridge rectifier including semiconductor diode rectifiers 54 and 56 and a pair of silicon controlled rectifiers (SCR) 58 and 60. The AC power supply potential is applied across bridge terminals 62 and 64 while the photocells 50 and 52, which are connected in series, have one side coupled to bridge terminal 66 which is opposite terminal 67 to which the SCR's are connected. The opposite end of the series connected photocells 50 and 52 is commonly connected to the gate electrodes of silicon controlled rectifiers 58 and 60. The circuit of FIG. 8 also shows the lamps 34 and 36 being connected in series across the AC power supply potential applied to terminals 63 and 65 through a rheostat 68 which serves as a brightness control for the energization of the two lamps 34 and 36.

An additional component on the A.C. powered circuit of FIG. 8 is a variable resistor, 150, in series with the photoconductive cells 50 and 52. The function of the variable resistor 150 is to control the responsiveness of the Photoconductive cells by controlling the voltage drop across them.

In operation, when both photocells 50 and 52 receive light simultaneously from the lamps 34 and 36, such as when the apertures 30 and 32 are in the position shown in FIG. 7 the SCRs 58 and 60 are rendered conductive, whereupon full wave rectified DC current will flow through the coil 27 of electromagnet 26 in a manner well known to those skilled in the art. When the plate 28 rotates to a position where one of the two photocells 50 and 52 are blocked so that light no longer impinges thereon, the SCRs 58 and 60 become non-conductive, causing the rectifier bridge to become inoperative such that current no longer is permitted to flow through the coil 27 and electromagnet 26 will become deenergized. Thus it can be seen that by selectively angularly orienting the plate 28 on the shaft 16, the electromagnet 26 can be energized at any desired portion of a full revolution of the assembly to pulse the motor at the required time during each revolution.

Referring now to FIG. 9, disclosed therein is a DC powered circuit for operating the electromagnet coil 27. As shown, the lamps 34 and 36 are connected in series across a DC power supply potential applied to terminals 69 and 71 through the brightness control rheostat 68. While the photocells 50 and 52 are again connected in series, they are now connected to the base of a p-n-p transistor 70 whose emitter is connected to the positive side of the DC supply through the resistor 72 and whose collector is connected to the base of a p-n-p transistor 74 through the coupling resistor 76. The emitter of transistor 74 is connected to the negative side of the supply potential through the resistor 78 and its collector is connected to the base of a second p-n-p transistor 80 by means of the resistor 82. The emitter of transistor 80 is directly connected to the positive side of the power supply potential while the collector is connected to the negative side of the power supply potential through the electromagnet coil 27.

The variable resistor 151 in series with elements 50 and 52 of FIG. 9 serves to control the responsiveness of the photoresistive cells by controlling the voltage drop across them.

In operation, when the photocells 50 and 52 are not receiving light energy, no base current is applied to the transistor 70. However, when they are illuminated, transistor 70 will become conductive to turn on the other two transistors 74 and 80 with the value of the various resistors 72, 76, 78 and 82 serving to establish the proper operating current levels of the devices so that a simple on-off operation is provided to energize the coil 27 at the appropriate time of each revolution of the motor assembly described with reference to the foregoing figures.

What has been shown and described thus far is a longitudinal axial embodiment of a permanent magnet pulse motor wherein the forces between opposing permanent magnets are generated by mutually reverse spiraling faces which are defined by a predetermined arithmetic or geometric progression. What will now be considered is a variation in structure wherein a pair of opposing permanent magnet elements are arranged in co-planar relationship but whose magnetic interacting forces cause one of the co-planar elements to rotate within the confines of the other element. To this end, reference will now be made to FIGS. 10 and 11 which disclose a plan view and a sectional view thereof of a planar embodiment of a permanent magnet motor which includes an inner and outer band 82 and 84 of permanent magnet material whose adjacent portions are oppositely poled with respect to one another. It can be seen in FIG. 10 that the inner band 82 spirals outwardly in a clockwise direction, while the outer band 84 spirals outwardly in a counterclockwise direction. Moreover, the inside spiral 82 is in a geometric progression equivalent to the radial progression of the faces of the permanent magnets 18 and 20 in the embodiment shown in FIG. 1 and defined by equations (11) through (14), while the outside spiral is an arithmetic progression as defined by equations (1) through (6). The inner band 82 furthermore is secured to a circular disc 86 which is mounted on a spindle 88 and comprises the rotor or armature assembly of the motor. The spindle 88 pivots on a plate 90 secured to a base member 92 as shown in FIG. 11. The base member 92 is also adapted to support a bridging element 94 which spans the structure and includes a bore 96 through which the spindle 88 passes and is supported thereby. In addition to the permanent magnetic band 82, the disc 86 also supports an electric lamp 98 which is adapted to rotate and periodically illuminate a photocell 100 mounted on the plate 90. Additionally, the disc 86 also includes a relatively square permanent magnet element 102 which is adapted to operate in conjunction with an electromagnet 104 which is mounted on top of the bridge element 94.

The electromagnet 104 is adapted to be energized by a circuit such as shown in FIGS. 8 and 9 with power to the lamp 98 being provided by means of the slip rings, for example, not shown associated with the spindle 88. The polarity of the permanent magnet element 102 and the electromagnet 104 are selectively chosen so that when the permanent magnet 102 rotates under the electromagnet 104, it will be pulsed to effect further rotation of the disc 86 through the attractive force between elements 102 and 104. However, rotation of the disc 86 is primarily effected by the interaction of the magnetic fields between the bands 82 and 84. As shown in FIG. 11, the outer band 84 is mounted on a flat supporting element 106 which in turn is positioned on top of pedestal elements 110 attached to the base member 92. The two permanent magnet bands 82 and 84 are thus substantially co-planar and are poled so that a mutually attractive force exists between the inner and outer bands 82 and 84. Such a configuration operates in substantially the same manner as that described with respect to embodiment shown in FIG. 1 since a mutually eccentric attractive magnetic field causes rotation of the disc 86 until an equilibrium position is reached, at which time an electromagnet 104 is energized which acts on the element 102 to pulse the disc 86 away from the equilibrium position until such time that the eccentric attractive magnetic fields interact once again to effect further rotation.

Figure 10:
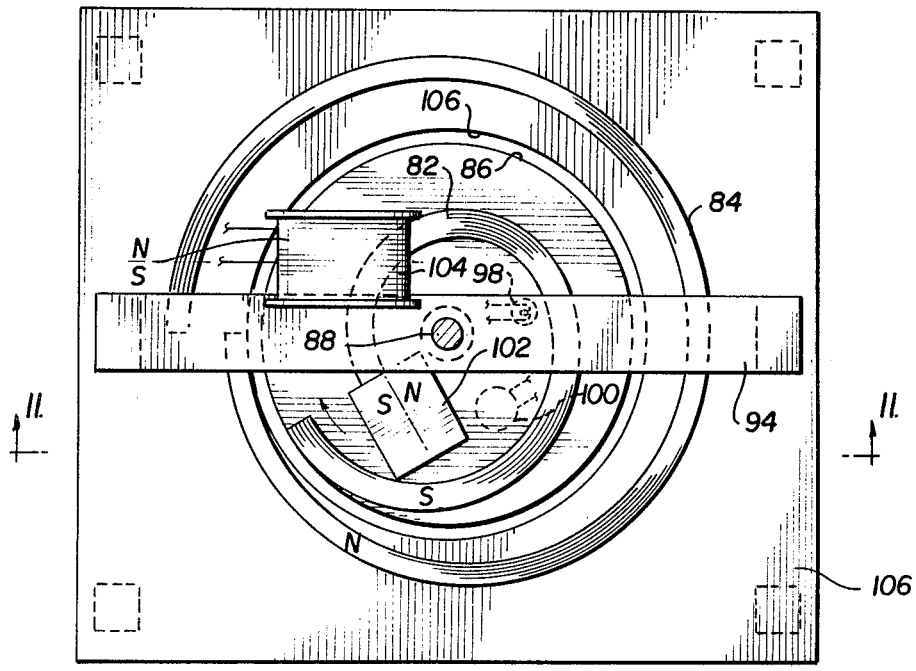
FIG. 10 is a top planar view of an alternate embodiment of the subject invention.
Figure 11:
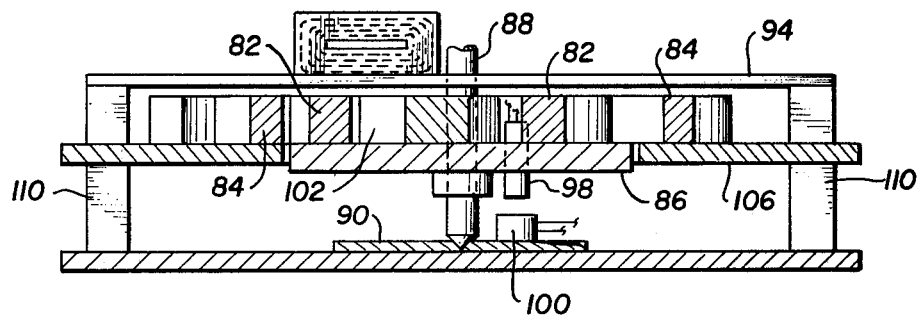
FIG. 11 is a sectional view of the embodiment shown in FIG. 10 taken along the line 11—11 thereof.
Figure 12:
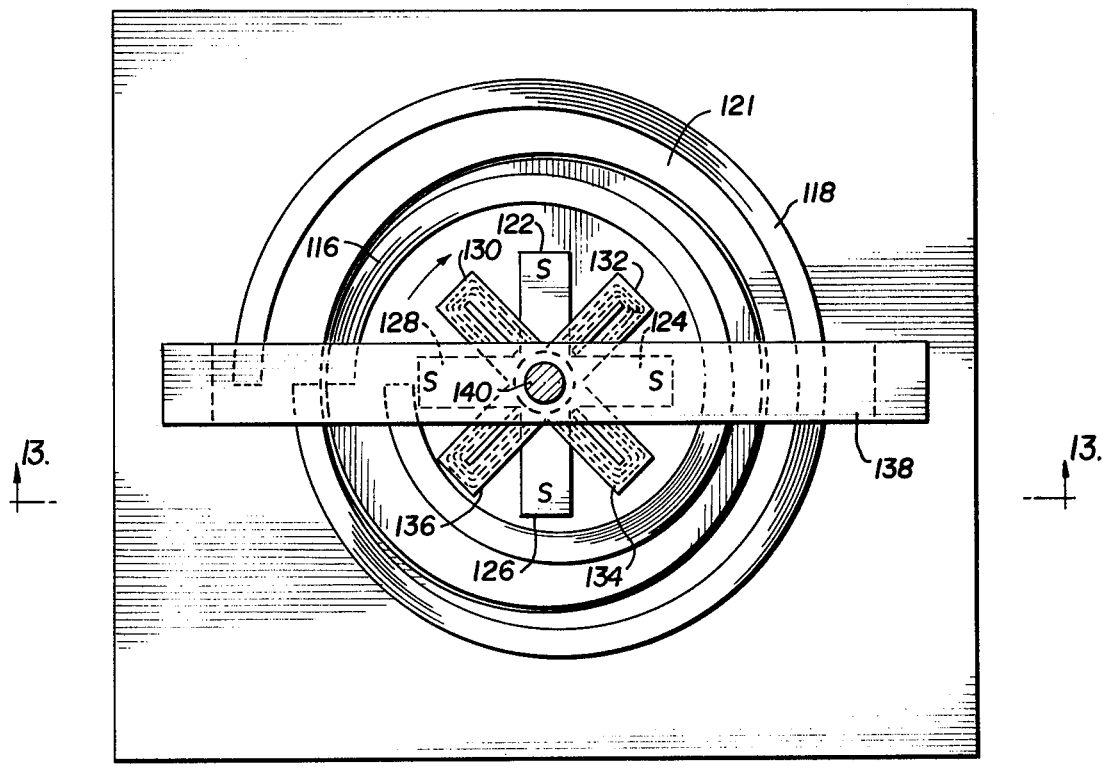
FIG. 12 is a top planar view of yet another alternative embodiment of the subject invention.
Figure 13:
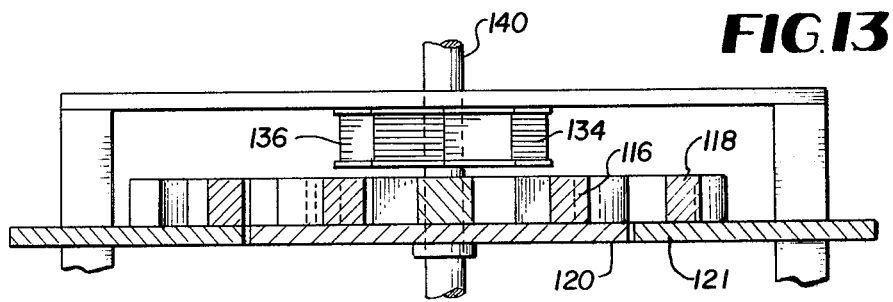
FIG. 13 is a sectional view of the embodiment shown in FIG. 12 taken along the lines 13—13.

As to the embodiment shown in FIGS. 12 and 13, it resembles the planar embodiment shown in FIGS. 10 and 11; however, this structure is intended to operate as an electrical generator, whereas the former two embodiments are intended to operate as a motor. As shown in FIG. 12, the embodiment includes an inner and outer band of oppositely poled permanent magnet material designated by reference numerals 116 and 118. The inner band 116 is mounted on a disc type rotor member 120 while the outer band 118 is mounted on a flat stator type element 121. Whereas the bands 82 and 84 shown in FIG. 10 progress in mutually opposite directions, the permanent magnet bands 116 and 118 both progress arithmetically outwardly in a counterclockwise direction. The rotor disc 120 in addition to containing the inner band 118, also includes four orthogonally oriented elongated permanent magnets 122, 124, 126 and 128 which underlie four electrical coils 130, 132, 134 and 136 which are mounted on the underside of a bridge type member 138 as shown in FIG. 13.

The arithmetic progression of the inner and outer bands of the radial spiral of the permanent magnet material 116 and 118 are defined by the expressions set forth in equations (1) and (2), the only difference being that the base radii $R_o$ is different for the inner and outer bands. The four permanent magnet elements 122, 124, 126 and 128 are polarized so that their outer end portions have the same polarity as that shown with respect to the inner band 116. With the outer band 118 having the opposite polarity, the torque is exerted on the inner band 116 which causes a rotation of the disc 120 and if the unit span of progression $\theta_D$ is chosen to be 90°, the disc 120 will rotate 270° at which point an equilibrium position is reached. During this rotation, an EMF is induced in the coils 130, 132, 134 and 136. At the equilibrium point it becomes necessary to apply a rotational force to the axle member 140, to which the rotary disc 120 is attached. It should be noted that due to the conservation of energy, the electrical energy induced in the coils 130, 132, 134 and 136 is subtracted from the energy of rotation and hence the speed of rotation of the disc 120 will be slower than if it were configured as a motor. What is significant, however, is the fact that the interaction of the inner and outer bands 116 and 118 aid the rotation of the disc 120 so that less energy has to be applied to the spindle or axle 140 which results in an increased efficiency in the generation of electricity in a rotary machine.

Having thus shown and described what is at present considered to be the preferred embodiments of the subject invention, it should be pointed out that all alterations, modifications and changes coming within the spirit and scope of the invention as set forth in the appended claims are herein meant to be included.

What is claimed is:

1. A rotary permanent magnet machine receiving rotational power from the interaction of at least two permanent magnetic fields, comprising in combination:

at least two adjacent coaxial permanent magnetic members, one of which is fixed and the other of which is rotatably movable, said magnetic members each comprising mutually reverse spiral-like curvilinear magnet configurations of selective polarity and having surfaces the outer edges of which have a radius which expands in an arithmetic or geometric progression to provide interacting mutually repulsing or attracting magnetic fields which rotate the rotatable movable member to a position of field equilibrium; and means for rotating the rotatably movable member past the position of magnetic field equilibrium to an eccentric field condition whereupon continued rotation is caused by said interacting fields until the position of field equilibrium is reached in the subsequent rotational period.

2. The rotary machine as defined by claim 1 wherein said surfaces comprise planar surfaces.

3. The rotary machine as defined by claim 1 wherein the arithmetic or geometric progression of the radius of one member expands in a clockwise direction while the radius of the other member expands in a counterclockwise progression.

4. The rotary machine as defined by claim 3 wherein said progression comprises an arithmetic progression expressed in x and y rectilinear coordinates as:

$$y = \sin \theta (R_o \pm n\theta/\theta_D)$$

$$x = \cos \theta (R_o \pm n\theta/\theta_D)$$

where $R_o$ is the base radius, $\theta$ is any angle between 0° and 360°, $\theta_D$ is a unit span of progression and comprises 360° divided by an integer, n is a linear measurement of the change in radius over the unit span of progression, and wherein the + defines a counterclockwise progression while the − defines the clockwise progression.

5. The rotary machine as defined by claim 3 and wherein said progression in a counterclockwise direction comprises a geometric progression expressed in x and y rectilinear coordinates as:

$$y = \sin \theta [R_o + 2^m n\theta/\theta_D(m+1)]$$

$$x = \cos \theta [R_o + 2^m n\theta/\theta_D(m+1)]$$

and wherein said progression in a clockwise direction comprises a geometric progression expressed as:

$$y = \sin \theta [R_o + 2^m n(\theta_D(m+1)/\theta)]$$

$$x = \cos \theta [R_o + 2^m n(\theta_D(m+1)/\theta)]$$

where $R_o$ is the base radius, $\theta$ is any angle between 0° and 360°, $\theta_D$ is a unit span of progression and comprises 360° divided by an integer, m is a selected member of angular divisions of 360° and progresses in value for each succeeding angular division, and n is a linear measurement of the change in radius over the unit span of progression.

6. The rotary machine as defined by claim 3 wherein mutually opposing surfaces of said adjacent magnetic members exhibit the same magnetic polarity whereupon mutually repulsive eccentric magnetic fields are provided to rotate the rotatable member.

7. The rotary machine as defined by claim 6 wherein said magnetic members are comprised of solid elements having a uniform thickness throughout.

8. The rotary machine as defined by claim 7 wherein the thickness of one magnetic member is greater than the thickness of the other permanent magnetic member.

9. The rotary machine as defined by claim 8 wherein the thickness of the rotatably movable permanent magnet is greater in thickness than that of the fixed magnetic member.

10. The rotary machine as defined by claim 3 wherein said magnetic members are comprised of solid elements which vary in graduating thickness around their respective outer perimeter.

11. The rotary machine as defined by claim 10 wherein the thickness of said members varies in an arithmetic or geometric progression.

12. The rotary machine as defined by claim 11 wherein the progression of thickness t of one magnetic member comprises an arithmetic progression defined by the expression:

$$t = 2n\theta/\theta_D$$

and wherein the thickness of the other magnetic member is defined by the expression:

$$t = 2n(360 - \theta/\theta_D)$$

where $\theta_D$ is a unit span of radius progression and comprises 360° divided by an integer, $\theta$ is any predetermined angle of radius between 0° and 360°, and n is the linear measurement of change in radius measured from the central axis of the perimeter over said unit span of progression.

13. The rotary machine as defined by claim 3 wherein the progression of thickness (t) of one magnetic member comprises a geometric progression defined by the expression:

$$t = 2[2^m n\theta/\theta_D(m+1)]$$

and wherein the thickness of the other magnetic member is defined by the expression:

$$t = 2[2^m n\theta_D(m+1)/\theta]$$

where $\theta$ is any angle between 0° and 360°, $\theta_D$ is a unit span of progression and comprises 360° divided by an integer, m is a selected number of angular divisions of 360° and progresses in value for each succeeding angular division, and n is a linear measurement of the change in radius over the unit span of progression.

14. The rotary machine as defined by claim 3 and additionally including at least one other fixed magnetic member, at least one other rotatably movable member, and a common shaft linking said rotatable members forming thereby a compound rotor and wherein the fixed and rotatably movable magnetic members alternate in position along said shaft.

15. The rotary machine as defined by claim 14 wherein the fixed permanent magnetic members are of substantially the same size and wherein said rotatably movable magnetic members are of substantially the same size.

16. The rotary machine as defined by claim 1 wherein said means for rotating the rotatably movable member past a position of magnetic field equilibrium comprises another rotatably movable permanent magnet member coupled to said first recited movable member, selectively energized electromagnet means located adjacent said another rotatably movable permanent magnet member, and additionally including means for energizing said electromagnet means at said position of field equilibrium and being poled with respect to said another movable member when energized to rotate said member a predetermined span of rotational arc and thereafter becoming deenergized.

17. The rotary machine as defined by claim 16 wherein said electromagnet means includes an electrical coil and said means for energizing said electromagnet means comprises an electrical switch circuit for coupling electrical power to said coil and electrical circuit interruptor means including at least one light source, means responsive to light emitted from said light source, and an intermediate rotatable element coupled to said rotatably movable magnetic member and having an aperture for coupling light from said light source to said light responsive means at a position of rotation corresponding to said position of field equilibrium, and wherein said means responsive to said light is adapted to cause electrical circuit means to become operative to couple power to said electromagnet coil.

18. The rotary device as defined by claim 17 wherein said light means comprises a pair of light sources, said light responsive means comprises a pair of light responsive elements, and said intermediate element comprises a rotatable disc having a pair of apertures therein and being adapted at a predetermined rotational position to simultaneously couple light from both light sources to both light responsive elements wherein said light responsive elements are connected in series to energize said electrical circuit means only when both elements receive light from said pair of sources.

19. The rotary machine as defined by claim 17 wherein said electrical switch circuit is comprised of a bridge rectifier circuit coupled to an AC source and including a pair of silicon controlled rectifiers having respective gate electrodes which are coupled to said series connected light responsive elements, said silicon controlled rectifiers being rendered conductive when both light responsive elements receive light to apply DC power from said bridge rectifier to said coil.

20. The rotary machine as defined by claim 17 wherein said electrical switch means includes at least one transistor coupled to a DC source and coupled to said series connected light responsive elements to be rendered conductive thereby to couple said DC source to said coil when both light responsive elements receive light.

21. The rotary machine as defined by claim 1 wherein said permanent magnetic members are comprised of coplanar annular permanent magnet members.

22. The rotary machine as defined by claim 21 wherein said annular members comprise an inner and outer band of permanent magnet material respectively located on a coplanar rotor and stator member.

23. The rotary machine as defined by claim 22 wherein said inner band progresses radially outwardly in a first rotational direction and the outer band progresses outwardly in the opposite rotational direction.

24. The rotary machine as defined by claim 22 wherein the inner band progresses radially outwardly in a geometric progression and the outer band progresses radially outwardly in an arithmetic progression.

25. The rotary machine as defined by claim 24 wherein said inner and outer bands are magnetized to provide mutually attractive magnetic forces between said bands which rotate the rotor containing said inner band of permanent magnetic material until an equilibrium position is reached.

26. The rotary machine as defined by claim 22 wherein said inner and outer bands progress radially outward in the same rotational direction.

27. The rotary machine as defined by claim 22 and wherein said rotor member additionally includes a plurality of orthogonally oriented generally elongated permanent magnet members mounted on said rotor member and a plurality of orthogonally located electrical induction coils mounted adjacent said plurality of elongated magnetic members on said stator member, said induction coils being adapted to conduct induced electrical currents therein upon rotation of said rotor member.

* * * * *